(12) United States Patent
Shibata

(10) Patent No.: US 6,744,889 B1
(45) Date of Patent: Jun. 1, 2004

(54) SUBSCRIBER CIRCUIT FOR PUBLIC TELEPHONE SET

(75) Inventor: Hirohiko Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/318,827

(22) Filed: May 26, 1999

(30) Foreign Application Priority Data

May 26, 1998 (JP) .............................. 10-144806

(51) Int. Cl.<sup>7</sup> .............................. H04M 19/00
(52) U.S. Cl. ....................... 379/413; 379/146
(58) Field of Search .................. 379/146, 155; 381/94.1, 5, 8, 9

(56) References Cited

U.S. PATENT DOCUMENTS

| | | | | |
|---|---|---|---|---|
| 4,872,199 A | * | 10/1989 | Kawami et al. | ........... 379/413 |
| 5,644,641 A | * | 7/1997 | Ikeda | ........... 381/94.1 |
| 5,970,099 A | * | 10/1999 | Zhou | ........... 375/285 |

FOREIGN PATENT DOCUMENTS

| JP | 60-76857 | 5/1985 |
|---|---|---|
| JP | 60-204193 | 10/1985 |
| JP | 61-269488 | 11/1986 |
| JP | 5-51350 | 8/1991 |
| JP | 7-71321 | 7/1995 |

* cited by examiner

*Primary Examiner*—Minsun Oh Harvey
*Assistant Examiner*—Daniel Swerdlow
(74) *Attorney, Agent, or Firm*—Foley & Lardner LLP

(57) ABSTRACT

The invention provides a subscriber circuit for a public telephone set which eliminates the necessity to make a voice signal to be introduced to a channel filter a small signal. A voltage holding circuit is controlled with a polarity reversal indication signal which is supplied also to a loop current supply circuit so that a voltage detected by a line voltage detection circuit is held by the voltage holding circuit. A reversal circuit is controlled with the polarity reversal indication signal so that the polarity of the voltage held by the voltage holding circuit is reversed. The voltage of the reversed polarity is buffered by a low-pass filter having a characteristic same as that of a low-pass filter which buffers polarity reversal in the loop current supply circuit, and is then subtracted from the output of the line voltage detection circuit by a subtraction circuit.

8 Claims, 6 Drawing Sheets

SUBSCRIBER CIRCUIT FOR PUBLIC TELEPHONE SET

BACKGROUND OF THE INVENTION

1. Field of the Invention

The present invention relates to a subscriber circuit which accommodates a public (coin) telephone set, and more particularly to a technique for moderating, when a public telephone set accepts a coin, the influence of the acceptance of the coil coin upon a voice signal.

2. Description of the Related Art

A subscriber circuit which accommodates a public telephone set reverses, as a signal when it accepts a coin thrown in by a call originating person in accordance with a telephone rate, the polarity of loop current slowly upon acceptance of the coin and then reverses, after the coin is confirmed, the polarity of loop current slowly again. Since a variation in voltage between two subscriber lines then is superposed with a voice signal which is transmitted similarly as a variation in voltage between the two subscriber lines, the system must be designed so that the voltage variation as a signal of acceptance of a coin may not disturb transmission of the voice signal.

FIG. 1 shows a basic construction of a conventional subscriber circuit. Referring to FIG. 1, the frequency band usually handled as a voice signal on a telephone circuit ranges from 300 Hz to 3,400 Hz, and a voltage variation of a frequency lower than 300 Hz which appears between subscriber lines 1 and 2 is suppressed principally by a channel filter 6.

However, usually a high-pass filter 5 for removing a high dc voltage applied to the subscriber lines to supply loop current is placed between a line voltage detection circuit 4 for detecting a voltage variation between the subscriber lines 1 and 2 and the channel filter 6. Here, designing for preventing such slow reversal of the polarity of loop current which is preformed by a loop current supply circuit 3 is performed, for example, in such a manner as described below.

The slowness of reversal of the polarity of loop current is first set linearly so that components of the voice band may be reduced to such a magnitude that they cannot be sensed as noise by a speaker. Although a slow voltage variation by such setting is attenuated by the high-pass filter 5, since the high-pass filter 5 is designed such that it does not have an overlapping function with the channel filter 6 and is not complicated, the attenuation amount is limited, and a slow voltage variation remains with the output of the high-pass filter 5. The sensitivity of the line voltage detection circuit 4 is set so that a sum voltage variation of the slow voltage variation and the voice signal may not exceed the range of linear operation of the channel filter 6.

Therefore, the voice signal introduced to the channel filter 6 decreases by an amount corresponding to the slow voltage variation remaining with the output of the high-pass filter 5. The voice signal is required to be amplified to a predetermined level by the channel filter 6, and noise generated by the line voltage detection circuit 4 and the high-pass filter 5 and input equivalent noise generated by the channel filter 6 must be low as much. Accordingly, with such a designing example as described above, various severe requirements for a noise characteristic must be satisfied.

SUMMARY OF THE INVENTION

It is an object of the present invention to provide a subscriber circuit for a public telephone set which eliminates the necessity to make a voice signal to be introduced to a channel filter a small signal.

In order to attain the object described above, according to the present invention, a slow voltage variation which remains with an output of a high-pass filter is estimated to produce an estimation signal, and the estimation signal is subtracted from an input signal to a channel filter.

In particular, according to the present invention, there is provided a subscriber circuit for a public telephone set, comprising a loop current supply circuit for supplying loop current between two subscriber lines, a line voltage detection circuit for detecting a voltage variation between the two subscriber lines, a high-pass filter for principally removing a high dc voltage from an output signal of the line voltage detection circuit, a channel filter for setting a voice signal band, variation signal generation means for generating a variation signal corresponding to a voltage variation applied between the two subscriber lines upon and caused by acceptance of a coin, and subtraction means for subtracting the variation signal from a signal of the voltage variation between the two subscriber lines detected by the line voltage detection circuit.

The variation signal generation means may include a voltage holding circuit for holding a voltage detected by the line voltage detection circuit prior to a reversal of the polarity of loop current, a reversal circuit for reversing the polarity of the voltage held by the voltage holding circuit, and a low-pass filter for buffering the voltage of the reversed polarity from the reversal circuit with a characteristic same as that of a low-pass filter which buffers the polarity reversal in the loop current supply circuit.

As an alternative, the variation signal generation means may include a voltage holding circuit for holding a voltage detected by the line voltage detection circuit prior to a reversal of the polarity of loop current, a reversal circuit for reversing the polarity of the voltage held by the voltage holding circuit, a high-pass filter for attenuating the voltage of the reversed polarity from the reversal circuit with a characteristic same as that of a high-pass filter for removing a high dc voltage, and a low-pass filter for buffering the output voltage of the high-pass filter with a characteristic same as that of a low-pass filter which buffers the polarity reversal in the loop current supply circuit.

As another alternative, the variation signal generation means may include a voltage holding circuit for holding a voltage detected by the line voltage detection circuit prior to a reversal of the polarity of loop current, a buffer amplifier to which the voltage held by the voltage holding circuit is inputted, a reversal amplifier for reversing the polarity of an output of the buffer amplifier, a pair of switches for extracting the outputs of the buffer amplifier and the reversal amplifier in response to a signal which indicates reversal of the polarity of loop current and another signal representing acceptance of a coin, respectively, and a low-pass filter for buffering the voltage extracted by the switches with a characteristic same as that of a low-pass filter which buffers the polarity reversal in the loop current supply circuit.

As a further alternative, the variation signal generation means may include a voltage holding circuit for holding a voltage detected by the line voltage detection circuit prior to a reversal of the polarity of loop current, a buffer amplifier to which the voltage held by the voltage holding circuit is inputted, a reversal amplifier for reversing the polarity of an output of the buffer amplifier, a pair of switches for extracting the outputs of the buffer amplifier and the reversal amplifier in response to a signal which indicates reversal of the polarity of loop current and another signal representing acceptance of a coin, respectively, a high-pass filter for attenuating the voltage extracted by one of the switches with a characteristic same as that of a high-pass filter for removing a high dc voltage, and a low-pass filter for buffering the output voltage of the high-pass filter with a characteristic same as that of a low-pass filter which buffers the polarity reversal in the loop current supply circuit.

In the subscriber circuit for a public telephone set, a signal which is equivalent to a voltage variation between the two subscriber lines upon acceptance of a coin from which a voice signal is removed is produced, and the signal is subtracted from a voltage detected from the two subscriber lines to extract only the voice signal from the voltage variation between the two subscriber lines. Consequently, the voice signal having a sufficiently great amplitude can be supplied to the channel filter in the following stage.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
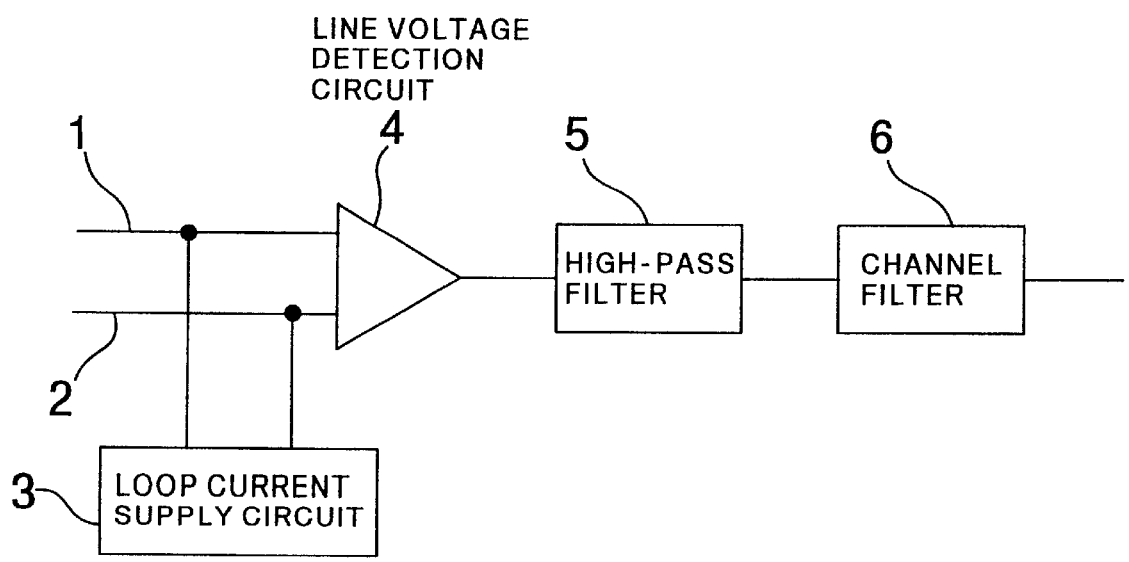
FIG. 1 is a block diagram showing a construction of a conventional subscriber circuit for a public telephone set.
Figure 2:
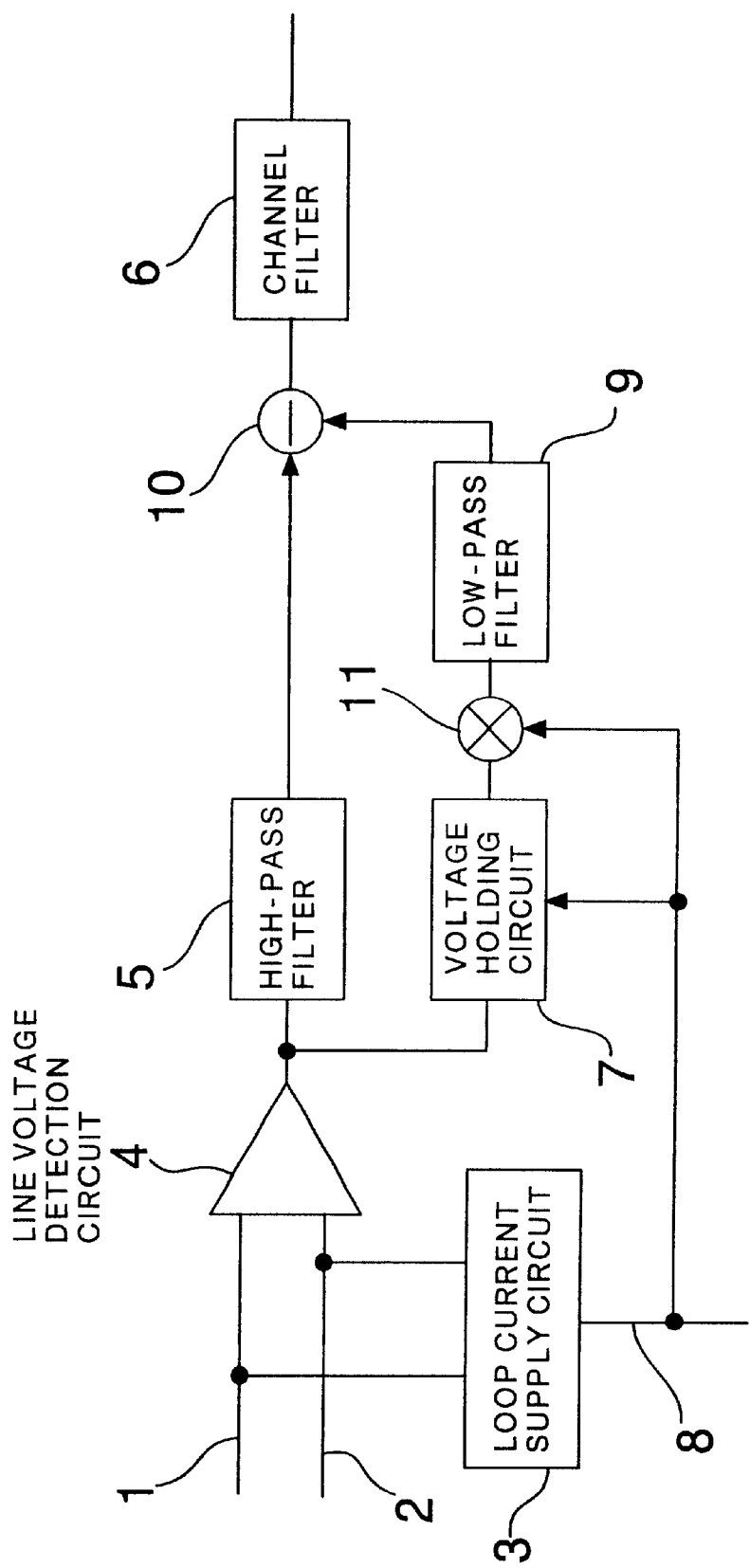
FIG. 2 is a block diagram showing a basic construction of a subscriber circuit for a public telephone set according to the present invention.

Referring to FIG. 2, there is shown a basic construction of a subscriber circuit for a public telephone set according to the present invention. The subscriber circuit shown includes subscriber lines 1 and 2, a loop current supply circuit 3, a line voltage detection circuit 4, a high-pass filter 5 and a channel filter 6 all similar to those of the conventional subscriber circuit for a public telephone set described hereinabove with reference to FIG. 1. In the subscriber circuit of FIG. 2, a voltage variation between the two subscriber lines 1 and 2 when a coin is accepted can be estimated from a voltage applied between the two subscriber lines 1 and 2 prior to a reversal and a slowness of reversal of the polarity of speech current set linearly so that components of the voice band cannot be sensed as noise by a speaker. With perception of this fact, the subscriber circuit for a public telephone set to which the present invention further includes a voltage holding circuit 7, a reversal circuit 11 for reversing a voltage of the voltage holding circuit 7, a low-pass filter 9, and a subtraction circuit 10.

Since the voltage applied between the two subscriber lines 1 and 2 prior to a polarity reversal depends upon the characteristic of the loop current supply circuit 3 and dc resistances of the subscriber lines and the telephone set, the voltage holding circuit 7 is controlled with a polarity reversal indication signal 8, which is supplied also to the loop current supply circuit 3, when the polarity reversal indication signal 8 indicates to end the state prior to a polarity reversal so that the voltage detected by the line voltage detection circuit 4 is held by the voltage holding circuit 7.

Then, the reversal circuit 11 is controlled with the polarity reversal indication signal 8 to reverse the polarity of the voltage held by the voltage holding circuit 7, and then the voltage of the reversed polarity is inputted to the low-pass filter 9 having a same characteristic as that of another low-pass filter (not shown) provided in the loop current supply circuit 3 for setting a slowness of polarity reversal. Consequently, at an output of the low-pass filter 9, a difference of the voice signal from the voltage variation between the two subscriber lines 1 and 2 upon acceptance of a coin is regenerated. Then, the output of the low-pass filter 9 is subtracted from the output of the line voltage detection circuit 4 by the subtraction circuit 10. Consequently, an influence of the reversal of the polarity of loop current is cancelled, and therefore, the voice signal to be introduced to the channel filter 6 need not be set to a low signal.

Figure 3:
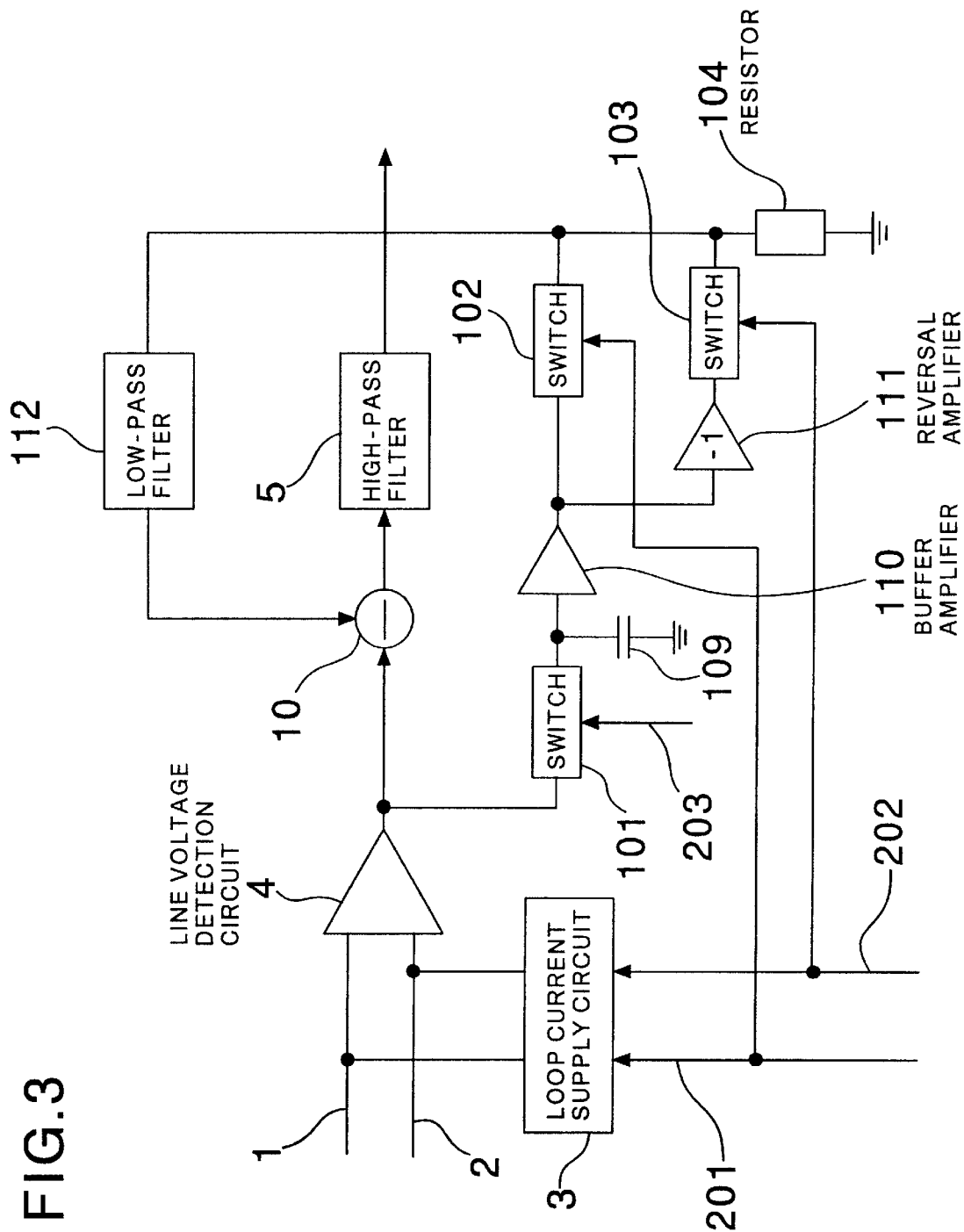
FIG. 3 is a block diagram of a subscriber circuit for a public telephone set to which the present invention is applied.

Referring now to FIG. 3, there is shown a subscriber circuit for a public telephone set to which the present invention is applied. The subscriber circuit for a public telephone set shown includes a loop current supply circuit 3, a line voltage detection circuit 4, analog switches 101, 102 and 103, a resistor 104, a capacitor 109, a buffer amplifier 110, a one-time (one-fold) reversal amplifier 111, a low-pass filter 112, a subtraction circuit 10, a high-pass filter 5, and a channel filter 6. As control signals for controlling the subscriber circuit, a signal 201 for indicating a state prior to a polarity reversal and a signal 202 for indicating a state after a polarity reversal are inputted to the loop current supply circuit 3, and a signal 203 which is a delayed signal of the signal 201 delayed by a fixed time is inputted to the analog switch 101.

Input terminals of the loop current supply circuit 3 and the line voltage detection circuit 4 are connected to the subscriber lines 1 and 2, and an output of the line voltage detection circuit 4 is connected to a terminal of the capacitor 109 through the analog switch 101 and also is supplied to an input of the subtraction circuit 10. The analog switch 101 is controlled with the signal 203 which is a delayed signal of the signal 201 delayed by the fixed time. Th other terminal of the capacitor 109 is grounded. The signal to the first-mentioned terminal of the capacitor 109 is inputted also to the buffer amplifier 110 which has a sufficiently high input resistance.

An output of the buffer amplifier 110 is inputted to the one-time reversal amplifier 111 and the analog switch 102 which is controlled with the signal 201 which is provided to the loop current supply circuit 3 and indicates a state prior to a polarity reversal. An output of the one-time reversal amplifier 111 is supplied to the analog switch 103 which is controlled with the signal 202 which indicates a state after a polarity reversal. The signals controlled by the analog switch 102 and analog switch 103 are coupled to a terminal of the resistor 104, which is grounded at the other terminal, and are further inputted to the low-pass filter 112. An output of the low-pass filter 112 is subtracted from the output of the line voltage detection circuit 4 by the subtraction circuit 10. An output of the subtraction circuit 10 is supplied to the high-pass filter 5.

Operation of the subscriber circuit described above with reference to FIG. 3 is described below with reference to a flow chart of FIG. 4.

First, while the signal 203 is active, the capacitor 109 is charged with a voltage prior to a loop current polarity reversal outputted from the line voltage detection circuit 4.

Then, as an operation for acceptance of a coin, the signal 201 which indicates a state prior to a polarity reversal applied to the loop current supply circuit 3 is rendered inactive. Simultaneously, the signal 203 is rendered inactive. At this time, the loop current supply circuit 3 gradually decreases loop current with such a degree of slowness that components of the voice band are reduced in magnitude so that they cannot be sensed as noise by the speaker. At the point of time when this operation starts, the signal 203 is rendered inactive, and consequently, the voltage prior to the loop current polarity reversal is held across the capacitor 109. The buffer amplifier 110 having a sufficiently high resistance inputs this voltage to the one-time reversal amplifier 111 without discharging the voltage.

Then, when the signal 202 becomes active, the loop current supply circuit 3 gradually increases the speech current now in the reverse direction to an absolute value equal to that prior to the reversal of the speech current with such a degree of slowness that components of the voice band are reduced to a magnitude with which they cannot be sensed as noise by the speaker. The line voltage is thus reversed in polarity but has an equal absolute value.

Here, if the acceptance of a coin is confirmed, then the signal 202 becomes inactive. The loop current supply circuit 3 thus gradually decreases the loop current with such a degree of slowness that components of the voice band are reduced to a magnitude with which they cannot be sensed as noise by the speaker in a similar manner as described above. Then, the signal 201 becomes active, and the line voltage slowly returns to the level equal to that prior to the sequence of reversals by an operation similar to that described above.

The signal 203 remains inactive for a time until the line voltage returns to the level equal to that prior to the reversal. The capacitor 109 is not discharged until the line voltage returns to the level equal to that prior to the reversal.

As a result of the operation described above, a voltage equal to the voltage applied between the subscriber lines 1 and 2 prior to the polarity reversal of the loop current and a voltage equal to but reverse in polarity to the voltage are outputted from the buffer amplifier 110 and the one-time reversal amplifier 111, respectively.

Figure 4:
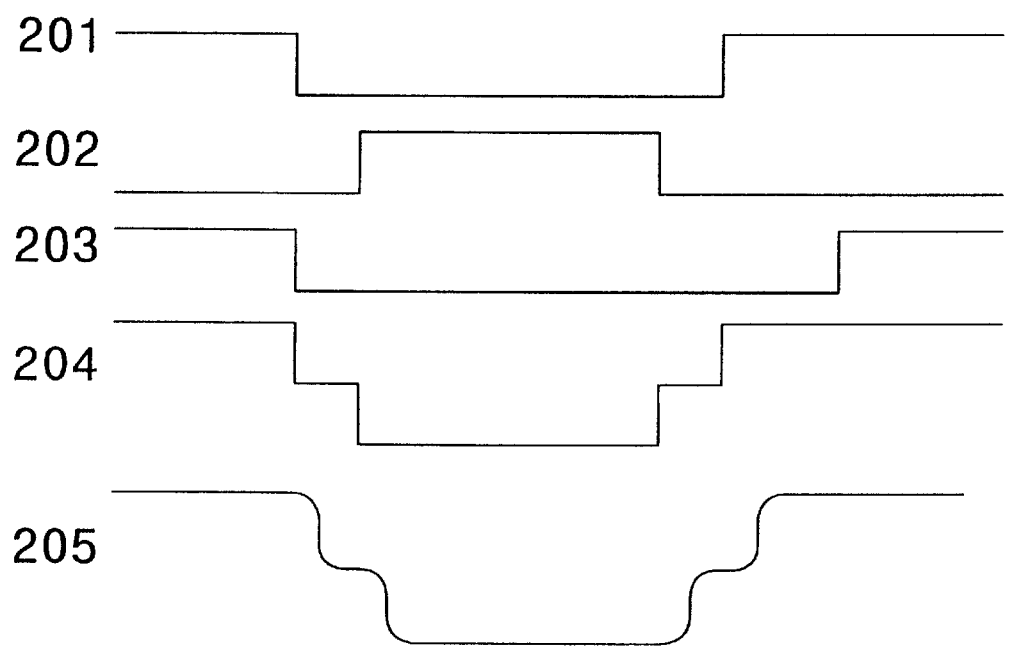
FIG. 4 is a timing chart illustrating operation of the subscriber circuit for a public telephone set of FIG. 3.

Here, if the output of the buffer amplifier 110 is opened or closed with the signal 201 and the output of the one-time reversal amplifier 111 is opened or closed with the signal 202 so that one of them is coupled to the terminal of the resistor 104 which is grounded at the other terminal thereof, then a signal 204 of FIG. 4 is obtained. Then, if the signal 204 is inputted to the low-pass filter 112, then a waveform 205 is obtained.

The waveform 205 becomes equal to a difference of the voice signal from a voltage variation between the two subscriber lines 1 and 2 upon acceptance of a coin if the low-pass filter 112 is designed with a characteristic same as that of the low-pass filter for setting the slowness of polarity reversal in the loop current supply circuit 3. The subtraction circuit 10 subtracts the waveform 205 from the output of the line voltage detection circuit 4 and inputs the difference signal, which is equivalent to the voltage variation between the two subscriber lines 1 and 2 from which an influence of the loop current polarity reversing operation is removed, to the high-pass filter 5.

Figure 5:
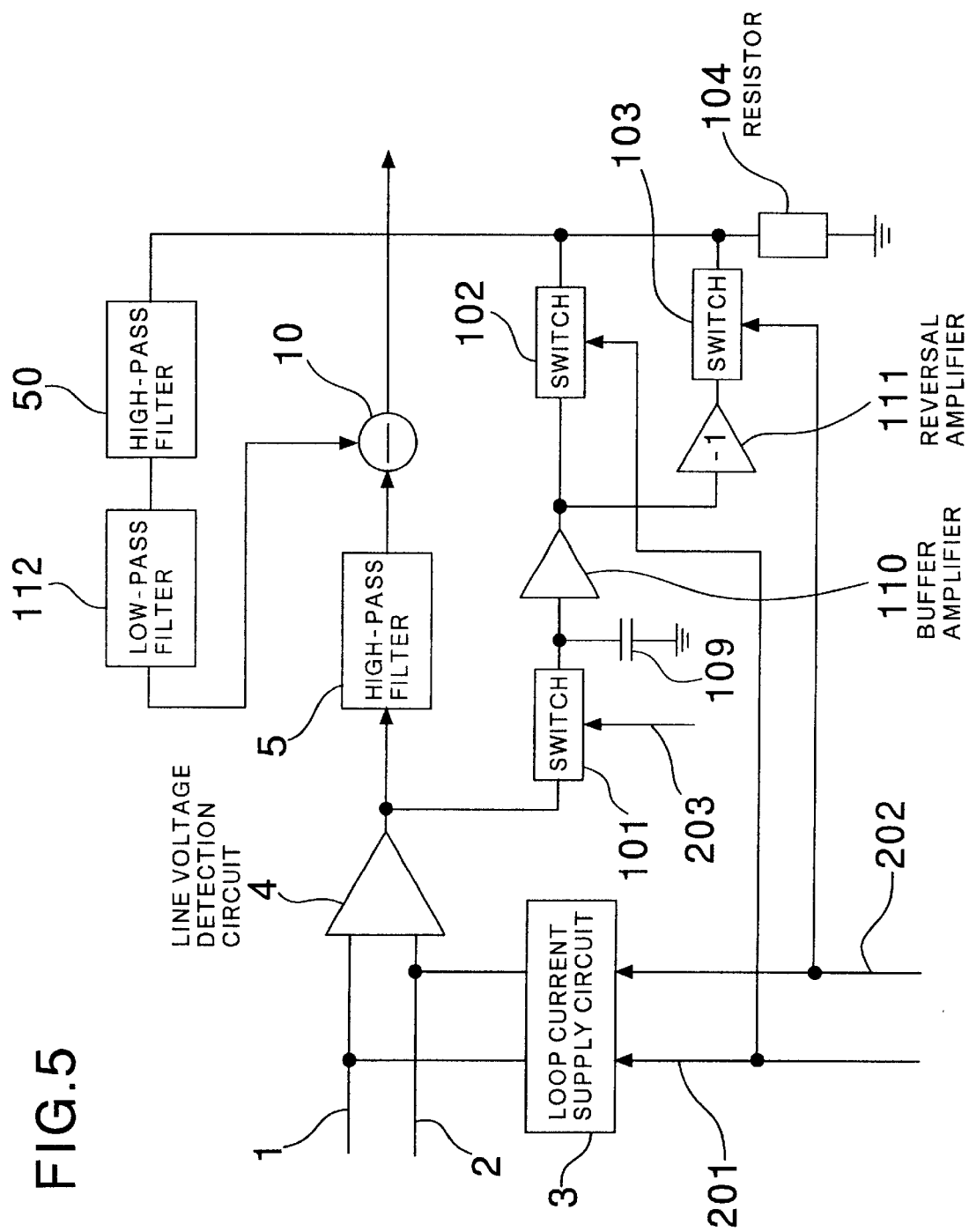
FIG. 5 is a block diagram showing a modification to the subscriber circuit for a public telephone set of FIG. 3.

Referring now to FIG. 5, there is shown a modification to the subscriber circuit for a public telephone set described hereinabove with reference to FIG. 3. The modified subscriber circuit is improved in regard to the amplitude of an estimation signal and includes, in addition to all of the components of the subscriber circuit for a public telephone set described hereinabove with reference FIG. 3, a high-pass filter 50 disposed in the preceding stage to the low-pass filter 112 and having a characteristic same as that of the high-pass filter 5 disposed in the preceding stage to the subtraction circuit 10 in FIG. 3 so that the subtraction circuit 10 may effect subtraction between two signals which have individually been processed by the high-pass filters.

While the high-pass filter 5 attenuates a slow voltage variation between the subscriber lines 1 and 2 upon acceptance of a coin to some degree as described hereinabove, the additionally provided high-pass filter 50 attenuates a signal, which is equivalent to the voltage variation upon acceptance of a coin with the voltage held fixed from which the voice signal is removed, to some degree. Accordingly, in the present modified subscriber circuit for a public telephone set, the amplitude of a signal handled by the subtraction circuit 10 is reduced, and this facilitates designing.

Figure 6:
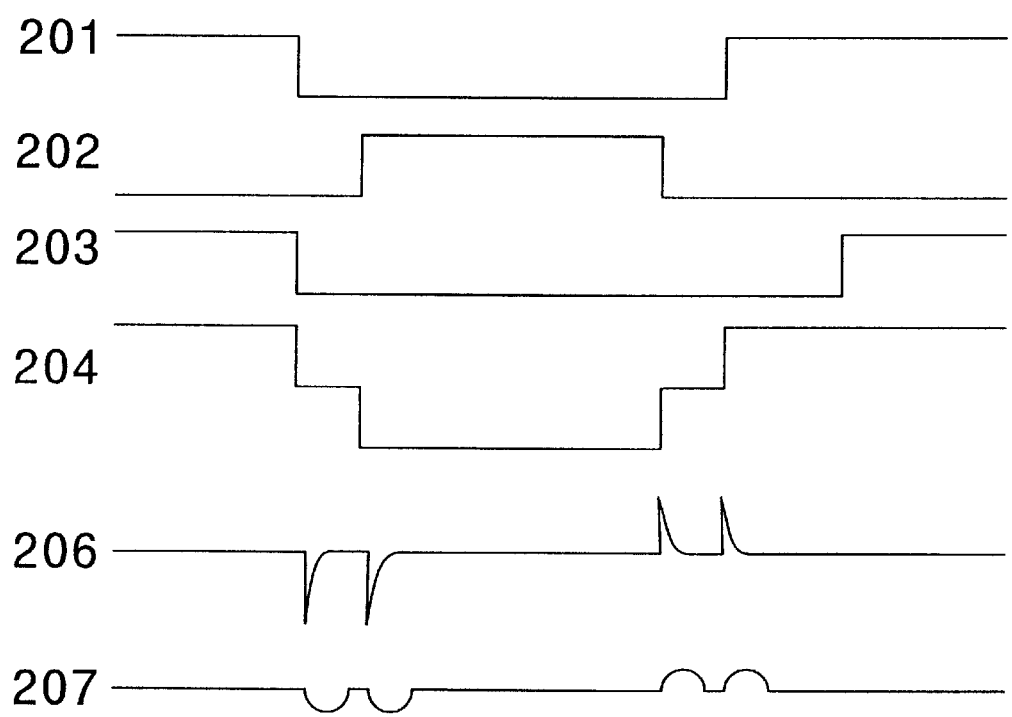
FIG. 6 is a timing chart illustrating operation of the modified subscriber circuit for a public telephone set of FIG. 5.

Waveforms of signals at several components of the modified subscriber circuit for a public telephone set are described with reference to FIG. 6.

The signals signal 201 to 204 have waveforms same as those of FIG. 4.

The output of the high-pass filter 50 to which the signal 204 across the resistor 104 is inputted has a waveform 206, and the output of the low-pass filter 112 to which the output of the high-pass filter 50 is inputted has a waveform 207. The subtraction circuit 10 processes the output of the high-pass filter 5 and the output of the low-pass filter 112 and outputs the voice signal which is included only in the output of the high-pass filter 5.

While a preferred embodiment of the present invention has been described using specific terms, such description is for illustrative purposes only, and it is to be understood that changes and variations may be made without departing from the spirit or scope of the following claims.

What is claimed is:

1. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a reversal circuit for reversing the polarity of the voltage held by said voltage holding circuit, and a low-pass filter for buffering the voltage of the reversed polarity from said reversal reversal circuit with a characteristic same as that of a low-pass filter which buffers the polarity reversal in said loop current supply circuit.

2. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a reversal circuit for reversing the polarity of the voltage held by said voltage holding circuit, a high-pass filter for attenuating the voltage of the reversed polarity from said reversal circuit with a characteristic same as that of a high-pass filter for removing a high dc voltage, and a low-pass filter for buffering the output voltage of said high-pass filter with a characteristic same as that of a low-pass filter which buffers the polarity reversal in said loop current supply circuit.

3. A subscriber circuit for a public telephone set, comprising:

a loop current supply circuit for supplying loon current between two subscriber lines;

a line voltage detection circuit for detecting a voltage variation between the two subscriber lines;

high-pass filter for principally removing a high dc voltage from an output signal of said line voltage detection;

a channel filter for setting a voice signal band;

variation signal generation means for generating a variation signal corresponding to a voltage variation applied between the two subscriber lines upon and caused by acceptance of a coin; and subtraction means for subtracting the variation signal from of the voltage variation between the two subscriber linear a detected by said line voltage detection circuit, wherein said variation signal generation means includes a voltage holding circuit for holding a voltage detected by said line voltage detection circuit prior to a reversal of the polarity of loop current, a buffer amplifier to which the voltage held by said voltage holding circuit is inputted, a reversal amplifier for reversing the polarity of an output of said buffer amplifier, a pair of switches for exacting the outputs of said buffer amplifier and said reversal amplifier in response to a signal which indicates reversal of the polarity of loop current and another signal representing acceptance of a coin, respectively, and a low-pass filter for buffing the voltage extracted by said switches with a characteristic same as that of a low-pass filter which buffers the polarity reversal in said loop current supply circuit.

4. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a buffer amplifier to which the voltage held by said voltage holding circuit is inputted, a reversal amplifier for reversing the polarity of an output of said buffer amplifier, a pair of switches for extracting the outputs of said buffer amplifier and said reversal amplifier in response to a signal which indicates reversal of the polarity of loop current and another signal representing acceptance of a coin, respectively, a high-pass filter for attenuating the voltage extracted by one of said switches with a characteristic same as that of a high-pass filter for removing a high dc voltage, and a low-pass filter for buffering the output voltage of said high-pass filter with a characteristic same as that of a low-pass filter which buffers the polarity reversal in said loop current supply circuit.

5. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a reversal circuit for reversing the polarity of the voltage held by said voltage holding circuit, and a low-pass filter for buffering the voltage of the reversed polarity from said reversal cit with a characteristic same as that of a low-pass filter which buffers the polarity reversal in said loop current supply circuit.

6. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high do voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a reversal circuit for reversing the polarity of the voltage held by said voltage holding circuit, a high-pass filter for attenuating the voltage of the reversed polarity from said reversal circuit with a characteristic same as that of a high-pass filter for removing a high dc voltage, and a low-pass filter for buffering the output voltage of said high-pass filter with a characteristic same as that of a low-pass filter which buffers the polarity reversal in said loop current supply circuit.

7. A subscriber circuit for a public telephone set, comprising:

a loop current supply circuit for supply loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a buffer amplifier to which the voltage held by said voltage holding circuit is inputted, a reversal amplifier for reversing the polarity of an output of said buffer amplifier, a pair of switches for extracting the outputs of said buffer amplifier and said reversal amplifier in response to a signal which indicates reversal of the polarity of loop current and another signal representing acceptance of a coin, respectively, and a low-pass filter for buffering the voltage extracted by said switches with a characteristic same as that of a low-pass filter which buffers the polarity reversal in said loop current supply circuit.

8. A subscriber circuit for a public telephone set, comprising:

a loop current supply circuit for supplying loop current between two subscriber lines;

a line voltage detection circuit for detecting a voltage variation between the two subscriber lines;

a high-pass filter for principally removing a high dc voltage from an output signal of said line voltage detection circuit;

a channel filter for setting a voice signal band;

variation signal generation means for generating a variation signal corresponding to a voltage variation applied between the two subscriber lines upon and caused by acceptance of a coin; and subtraction means for subtracting the variation signal from a signal of the voltage variation between the two subscriber lines detected by said line voltage detection circuit, wherein said variation signal generation means includes a voltage holding circuit for holding a voltage detected by said line voltage detection circuit prior to a reversal of the polarity of loop current, a buffer amplifier to which the voltage held by said voltage holding circuit is inputted, a reversal amplifier for reversing the polarity of an output of said buffer amplifier, a pair of switches for extracting the outputs of said buffer amplifier and said reversal amplifier in response to a signal which indicates reversal of the polarity of loop current and another signal representing acceptance of a coin, respectively, a high-pass filter for attenuating the voltage extracted by one of said switches with a characteristic same as that of a high-pass filter for removing a high dc voltage, and a low-pass filter for buffering the output voltage of said high-pass filter with a characteristic same as that of a low-pass filter which buffers the polarity reversal in said loop current supply circuit.

* * * * *